United States Patent [19]

Kagiyama et al.

[11] 4,113,174
[45] Sep. 12, 1978

[54] TEMPERATURE CONTROLLED VALVE ASSEMBLY

[75] Inventors: Yasuo Kagiyama, Toyonaka; Nobumasa Miyazaki, Mino, both of Japan

[73] Assignee: Daihatsu Diesel Manufacturing Co., Ltd., Toyonaka, Japan

[21] Appl. No.: 793,359

[22] Filed: May 3, 1977

[30] Foreign Application Priority Data

May 17, 1976 [JP] Japan .............................. 51-62945[U]

[51] Int. Cl.² ...................... G05D 23/12; G05D 11/16
[52] U.S. Cl. .................................... 236/12 A; 251/38
[58] Field of Search ................. 236/12 A; 251/38, 63; 137/90

[56] References Cited

U.S. PATENT DOCUMENTS

| 3,656,707 | 4/1972 | Marotta | 251/63 X |
| 3,791,578 | 2/1974 | Brand et al. | 251/38 X |
| 3,980,229 | 9/1976 | Stedman | 236/12 A |

Primary Examiner—William E. Wayner

[57] ABSTRACT

A temperature controlled valve assembly which comprises a temperature sensor for sensing variation in temperature of a mixed fluid of hot and cold fluid mediums, a proportioning valve member for regulating the amount of flow of the hot fluid medium relative to the amount of flow of the cold fluid medium in such a manner as to increase the amount of flow of the hot fluid medium to be mixed with the cold fluid medium when the temperature of the mixed fluid increases over a predetermined value and to increase the amount of flow of the cold fluid medium to be mixed with the hot fluid medium when the temperature of the mixed fluid decreases below the predetermined value, and a power piston for operating the proportioning valve member.

12 Claims, 5 Drawing Figures

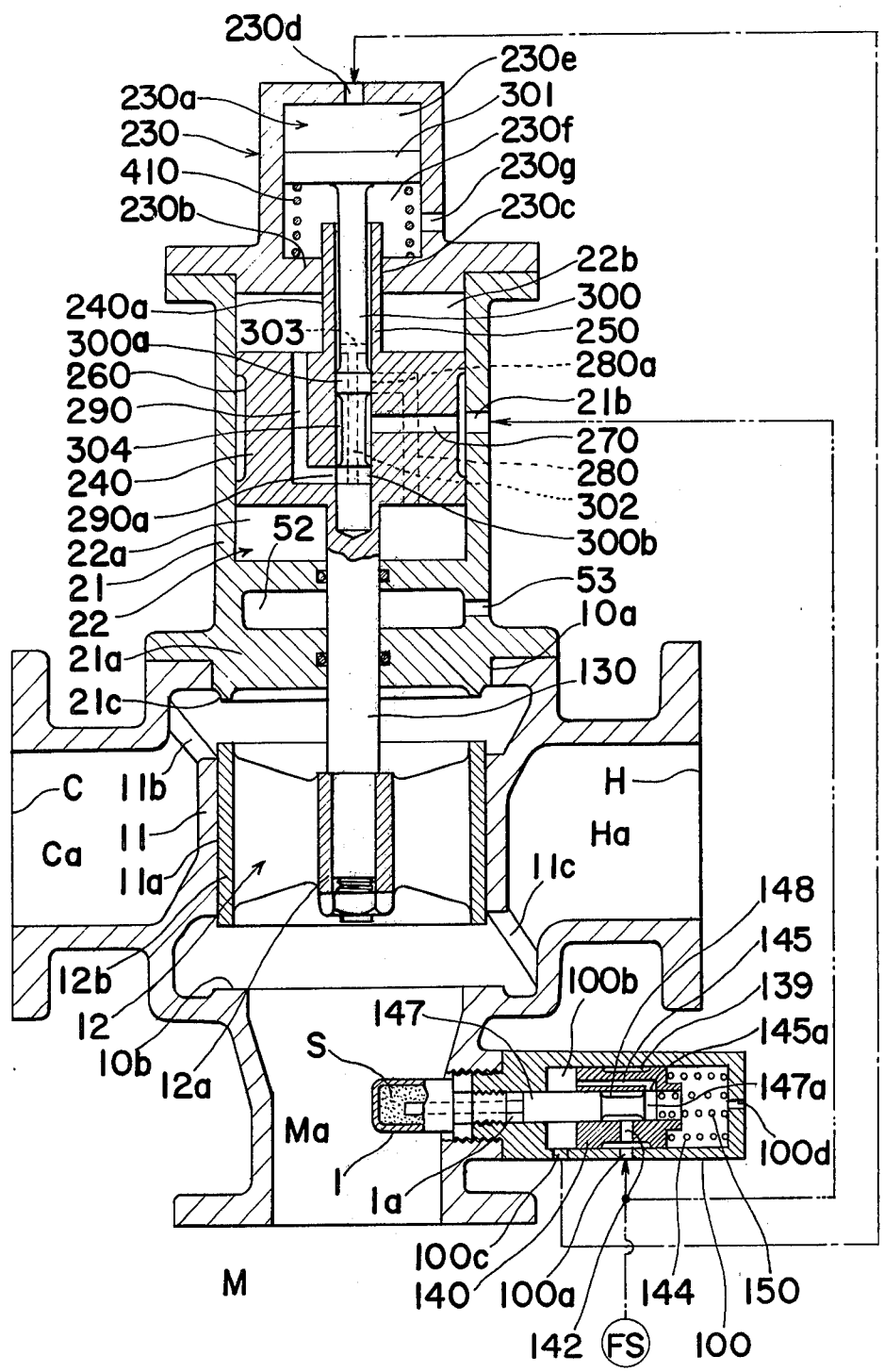

TEMPERATURE CONTROLLED VALVE ASSEMBLY

The present invention relates to a temperature controlled valve assembly.

There is known a temperature controlled valve assembly of a type having two inlet ports, through which fluid mediums of different temperatures are introduced into the valve assembly, and a common outlet port through which a fluid medium of controlled temperature, that is, a mixture of the fluid mediums of different temperatures, emerges from the valve assembly after the temperature of the mixture has been adjusted by proportioning the flow rate of either one of the fluid mediums introduced relative to that of the other of the fluid mediums introduced.

For example, the Japanese Unexamined Utility Model Publication No. 157019/1976, filed on June 9, 1975 and laid open to public inspection on Dec. 14, 1976, the invention of which is assigned to the same assignee of the present invention, discloses a temperature controlled valve assembly of the type referred to above, the construction of which is shown in FIG. 1 of the accompanying drawings. The details of the valve assembly disclosed in the above numbered publication will now be described in terms of its function with reference to FIG. 1.

Referring to FIG. 1, the temperature controlled valve assembly includes a temperature sensing column 1 filled therein with a thermally expansible material S, such as wax, supported in position within a valve casing at a junction between passages, which passages are respectively communicated to a first inlet port C for the introduction of a cold fluid medium, a second inlet port H for the introduction of a hot fluid medium, and a common outlet port M for the discharge of a mixture of the cold and hot fluid mediums. Assuming that a proportioning valve member 2 rigidly mounted on a sleeve 3a which is in turn connected or integrally formed with a servo-piston 3, is held in position by the action of a compression spring 4 to interrupt a fluid communication between the first port C and the common port M on one hand and to establish a fluid communication between the second port H and the common port M on the other hand as shown, an operating fluid under pressure supplied to an inlet port IN neither enter a working chamber Wa above the servo-piston 3 nor be discharged through an outlet port OUT. Starting from this condition and upon subsequent elevation of the temperature of the hot fluid medium flowing from the second inlet H towards the common outlet port M and consequent expansion of the thermally expansible material S within the temperature sensing column 1, an operating rod 5 which has one end slidingly extending into the column 1 and held in contact with the thermally expansible material S and the other end slidingly accommodated within and surrounded by a pilot valve member 6 is upwardly shifted against a return spring 7. Incident to the upward shift of the operating rod 5 against the return spring 7, the inlet port IN is communicated to the working chamber Wa through a first passage 6a, formed in the pilot valve member 6, then an annular space defined around the operating rod 5 between a pair of spaced lands 5a and 5b on said operating rod 5, and a second passage 6b, formed in the pilot valve member 6, by way of one or more passages formed at 8, whereby the operating fluid under pressure supplied to the inlet port IN is introduced into the working chamber Wa with the servo-piston 3 being consequently lowered.

Simultaneously with the lowering of the servo-piston 3 so effected, the pilot valve member 6 is also upwardly shifted against a compression spring 9 by the action of the operating fluid flowing under from the inlet port IN towards the working chamber Wa. However, since the compression spring 9 exerts an elastic force higher than that exerted by the compression spring 4, the servo-piston 3 moves a greater stroke than the stroke of movement of the pilot valve member 6 and there is a time lag between the moment at which the servo-piston 3 and the pilot valve member 6 start their respective downward and upward movement and the moment at which communication between the passages 6a and 6b is interrupted by the land 5a.

After the servo-piston 3 has been lowered and during the above described time lag, the proportioning valve member 2 so lowered together with the servo-piston 3 allows the fluid medium from the first inlet port C to admix with the flow of the fluid from the second inlet port H towards the common outlet port M.

After the valve assembly has been operated in this way and upon contraction of the thermally expansible material S within the column 1, the connecting rod 5 is downwardly shifted with the land 5a held in position to allow the operating fluid medium within the passage 6b and also within the working chamber Wa to be discharged to the outside of the valve assembly through the outlet port OUT whereby the servo-piston 3 may be returned to the original position with the proportioning valve member 2 held in position to interrupt the communication between the inlet port C and the common outlet port M.

The valve assembly of the construction described above is satisfactory in that a slight movement of the connecting rod resulting from expansion or contraction of the thermally expansible material within the temperature sensing column results in a great stroke of movement of the servo-piston. This means that the proportioning valve member is quick to respond to variation in temperature of the fluid mesium emerging from the valve assembly.

However, it has been found that, since in the valve assembly of the above described construction a return movement, that is, upward shift, of the servo-piston, which takes place when the servo-piston is relieved from the pressure acting on said servo-piston so as to bias the latter downwards, relies solely on the compression spring, the increased resistance to the movement of the proportioning valve member such as resulting from formation of scales at an area of sliding contact of the proportioning valve member to the surrounding wall of the valve casing inadvertently affects the return movement of the servo-piston, thereby lowering the response of the valve assembly to variation in temperature of the fluid medium emerging from such valve assembly.

Moreover, the valve assembly of the above described construction requires the provision of a guide sheath as at 10 in FIG. 1, extending internally of the sleeve 3a and externally of the connecting rod 5, assemblage of the temperature controlled valve assembly involves difficulties.

Accordingly, the present invention has been developed in view to substantially eliminating the above described disadvantages and inconveniences and is intended to provide an improved version of temperature controlled valve assembly which is reliable in performance and capable of giving a relatively high operating power necessary to move a proportioning valve member.

In any event these and other objects and features of the present invention will become apparent from the following description taken in conjunction with preferred embodiments thereof with reference to the accompanying drawings, in which:

FIGS. 4 and 5 are viwes similar to FIG. 2, respectively showing further embodiments of the present invention.

Before the description of the present invention proceeds, it is to be noted that like parts are designated by like reference numerals throughout the drawings.

Figure 2:
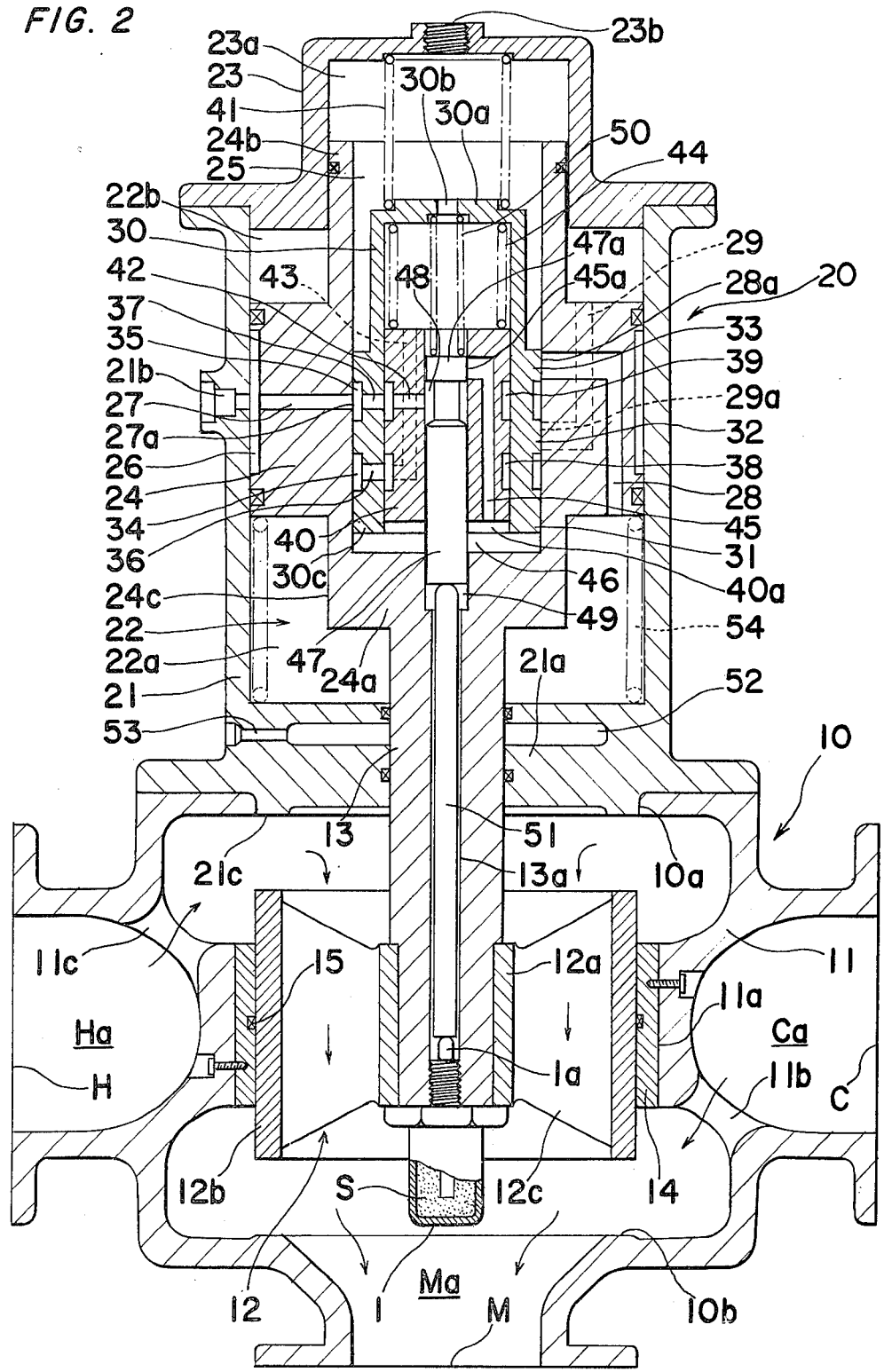
FIG. 2 is a longitudinal sectional view of a temperature controlled valve assembly according to one embodiment of the present invention.

Referring now to FIG. 2, a temperature controlled valve assembly according to one preferred embodiment of the present invention comprises a main valve casing 10 of substantially T-shaped contour having first and second inlet passages Ca and Ha, adapted to be connected through first and second inlet ports C and H to respective sources (not shown) of fluid mediums of different temperature, for example, cold and hot fluid mediums, and a common outlet passage Ma from which a mixture of the cold and hot fluid mediums from the first and second inlet ports C and H is discharged through a common outlet port M to the outside of the main valve casing 10. Within the main valve casing 10, there is provided a partition wall 11 of substantially hollow cylindrical shape shown to be integrally formed with the casing 10 in alignment with the common outlet passage Ma, a substantialy intermediate portion of said partition wall 11 being radially inwardly protruding to provide a cylindrical bearing surface 11a. The partition wall 11 is formed at 11b with a first aperture, through which the first inlet passage Ca is communicated to the interior of the partition wall 11, and at 11c with a second aperture through which the second inlet passage Ha is communicated to the interior of the partition wall 11, the interior of the partition wall 11 being in turn communicated to the common outlet passage Ma in a manner as will be described later.

The main valve casing 10 has a mounting hole, defined at 10a in alignment with the cylindrical bearing surface 11a, and a proportioning valve member 12 supported in the cylindrical bearing surface 11a for movement between first and second positions in a direction parallel to and in alignment with the longitudinal axis of said bearing surface 11a. This proportioning valve member 12 is constituted by a hub 12a, rigidly mounted on a lower end of an operating rod 13, and a cylindrical rim 12b arranged in coaxial relation to the hub 12a and connected to, or otherwise integrally formed with, the hub 12a by means of two or more connecting members 12c, such as spokes or connecting plates, which radially extend between said hub 12a and said rim 12b in equally spaced relation to each other.

Positioned between the outer peripheral surface of the rim 12b of the proportioning valve member 12 and the cylindrical bearing surface 11a and rigidly secured to the bearing surface 11a is a guide ring 14 preferably made of a metallic material having a high resistance to frictional wear, said guide ring 14 having an inner diameter greater than the outer diameter of the rim 12b. The guide ring 14 is shown to have at least one elastic seal ring 15 carried by the ring 14 on one hand and contacting the outer peripheral surface of the rim 12b on the other hand. This seal ring 15 serves not only to facilitate a smooth movement of the proportioning valve member 12 between the first and second positions, but also to avoid any possible entanglement of solid particles into the area of contact of the outer peripheral surface of the rim 12b to the guide ring 14.

However, it is to be noted that, depending upon the type of each of the fluid mediums respectively introduced through the first and second inlet ports C and H, the seal ring 15 may not be always necessary, in which case the guide ring 14 should have an inner diameter substantially equal to or slightly greater than the outer diameter of the rim 12b of the proportioning valve member 12. Alternatively, without the employment of the guide ring 14, the seal ring 15 may be provided on the cylindrical bearing surface 11a. It is also to be noted that, as can readily be conceived from the embodiment of FIG. 5, the employment of the guide ring 14 with the seal ring 15 may not be always necessary depending upon the type of any one of the fluid mediums with which the temperature controlled valve assembly embodying the present invention can operate.

Figure 1:
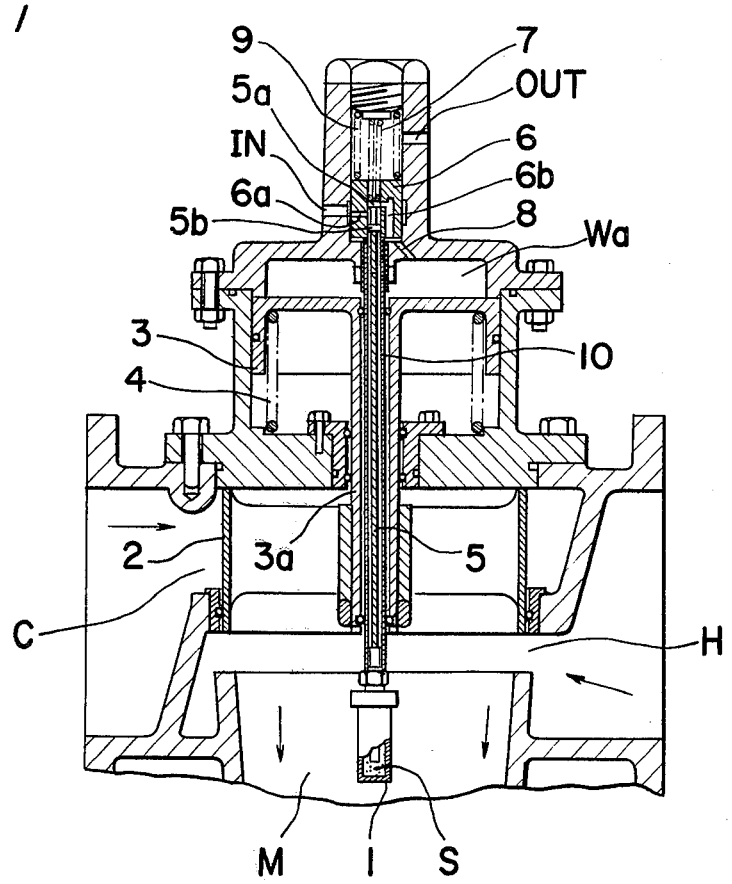
FIG. 1 is a longitudinal sectional view of the temperature controlled valve assembly, reference to which has already been made.

In the construction so far described, starting from a condition shown in FIG. 1 wherein the proportioning valve member 12 is shown to be positioned intermediately of its first and second positions, upward shift of the proportioning valve member 12 towards the first position in a direction away from the common outlet port M allows a more amount of the cold fluid medium from the first inlet port C to flow into the common outlet passage Ma than the hot fluid medium from the second inlet port H and, conversely, downward shift of the same valve member 12 towards the second position in a direction close to the common outlet port M allows a more amount of the hot fluid medium from the second inlet port H to flow into the common outlet passage Ma than the cold fluid medium from the first inlet port C. However, if an annular upper end face of the rim 12b is made to engage a valve seat, as will be described later, when the proportioning valve member 12 arrives at its first position, communication between the second inlet passage Ha and the common outlet passage Ma via discrete spaces defined by the connecting members 12c between the hub 12a and the rim 12b can be completely interrupted. Conversely, if an annular lower end face of the same valve member 12 is made to engage an annular valve seat, defined at 10b in the main valve casing 10, when the valve member 12 arrives at its second position, communication between the first inlet passage Ca and the common outlet passage Ma can be completely interrupted.

For effecting the movement of the proportioning valve member 12 in the manner described above in response to variation in temperature of the mixture of the hot and cold fluid mediums, the temperature controlled valve assembly according to the present invention includes a fluid-operated power cylinder, generally indicated by 20, which is mounted on the main valve casing 10, the details of which valve 20 will now be described.

Referring still to FIG. 2, the fluid-operated power cylinder 20 comprises a power cylinder casing 21 having a cylindrical compartment 22 defined therein, one end of which is closed by a cap 23 while the other end of said compartment 22 is closed by a bottom lid 21a shown to be integrally formed with the casing 21. The power cylinder is rigidly mounted on the main valve casing 10 with the bottom lid 21a tightly closing the mounting hole 10a in the main valve casing 10. The cap 23 is of a shape having a cavity 23a defined therein of a diameter smaller than the diameter of the compartment 22 and also having a vent hole defined at 23b in the cap 23.

Within the compartment 22 of the power piston casing 21, there is accommodated a power piston 24 of an outer diameter substantially equal to or slightly smaller than the diameter of the compartment 22, which piston 24 has a cylindrical hollow defined therein and having one end opening and the other end closed by a bottom wall 24a. This power piston 24 has its opposed end portions reduced in outer diameter to provide reduced diameter portions 24b and 24c, which are respectively adjacent the open end of the power piston 24 and the bottom wall 24a at the other end of the power piston 24, and is held in position within the compartment 22 with the reduced diameter portion 24b slidingly accommodated within the cavity 23a in the cap 23. This power piston 24 is movable between upwardly and downwardly shifted positions in a manner as will be described later, the movement of the piston 24 being transmitted to the proportioning valve member 12 through the operating rod 13 which has one end rigidly connected to said proportioning valve member 12 as hereinbefore described and the other end rigidly connected to, or otherwise integrally formed with, the bottom wall 24a. For the purpose as will become clear later, the operating rod 13 is in the form of a sleeve having one end receiving the temperature sensing column 1, removably threaded thereto, and the other end in communication with the cylindrical hollow 25 through an opening defined in the bottom wall 24a in alignment with the hollow in the operating rod 13.

The power piston 24 has an annular groove 26 defined on an outer peripheral surface thereof, said annular groove 26 being in communication with a source (not shown) of fluid under pressure through a fluid inlet 216 defined in the power cylinder casing 21. The annular groove 26 has a width so selected that at least one passage 27, which is defined in the power piston 24 and has a radially outer end opening towards the groove 26 and a radially inner end 27a opening on the inner peripheral surface of the power piston 24, can be always communicated to the fluid source through the groove 26 by way of the fluid inlet 216 irrespective of the position of the power piston 24 within the compartment 22. Also defined in the power piston 24 is at least one first supply passage 28 of a substantially L-shaped configuration and at least one second supply passage 29 of a substantially L-shaped configuration. The first supply passage 28 has one end 28a opening on the inner peripheral surface of the power piston 24 and the opposed end opening towards and in communication with one of two working chambers of the compartment 22 so divided by the power piston 24, said one of the two working chambers of the compartment 22 being identified by 22a while the other of the two working chambers is identified by 22b. On the other hand, the second supply passage 29 in the power piston 24 has one end 29a opening on the inner peripheral surface of the power piston 24 and the other end opening towards and in communication with the working chamber 22b of the compartment 22. The position of the open ends 27a, 28a and 29a of the respective passages 27, 28 and 29 will be described in more detail later.

The power piston 24 has a cylindrical hollow switching valve 30 accommodated within the cylindrical hollow 25 for movement between up and down positions. The switching valve 30 is of a construction having one end opening towards the bottom wall 24a of the power piston 24 and the other end closed by an apertured lid 30a having an aperture 30b. This switching valve 30 has an outer peripheral surface formed with three lands 31, 32 and 33 radially outwardly protruding an equal distance therefrom and held in sliding engagement with the inner peripheral surface of the power piston 24. A pair of annular grooves are respectively defined at 34 and 35 between the lands 31 and 32 and between the lands 32 and 33 and are respectively communicated through passages 36 and 37, defined in and radially extending in the switching valve 30, to annular grooves 38 and 39 which are defined on an outer peripheral surface of a cylindrical hollow follower valve 40 operatively accommodated within the hollow of the switching valve 30 in alignment with and in coaxial relation to the switching valve 30. This switching valve 30 is biased towards the down position by a compression spring 41 positioned between the cap 23 and the apertured lid 30a and, during this condition (although the valve 30 is, in FIG. 2, shown as positioned substantially intermediately between its up and down position,) the passage 37 is communicated to the passage 27 in the power piston 24 through the groove 35 which is in turn communicated to the working chamber 22b through the second supply passage 29. The down position of the switching valve 30 is defined by the bottom wall 24a to which an annular end face of the valve 30 adjacent the open end thereof and where a plurality of radially extending grooves are defined at 30c is seated.

The follower valve 40 is slidingly accommodated within the hollow of the switching valve 30 in alignment with and in coaxial relation to the switching valve 30 for movement between elevated and lowered positions in a manner as will be described later. The follower valve 40 has at least one passage 42, defined therein and having one end opening on the inner peripheral surface thereof and the other end in communication with the groove 39 on the outer peripheral surface thereof, and at least one passage 43 of substantially L-shaped configuration. The passage 43 has one end in communication with the groove 38 on the outer peripheral surface of the follower valve 40 and the other end opening towards the hollow in the switching valve 30 which is in turn communicated to the vent hole 23b in the cap 23 through the aperture 30b in the lid 30a on the switching valve 30.

This follower valve 40 is normally biased towards the lowered position by a compression spring 44 positioned within the hollow of the switching valve 30 between the apertured lid 30a and one of the opposed ends of said valve 40 remote from the bottom wall 24a. The lowered position of the follower valve 40 is defined by the bottom wall 24a to which an annular end face of the valve 40 opposite to said one end of the valve 40 and where a plurality of radially extending grooves 40a are defined is seated. The follower valve 40 is also formed with at least one passage 45 of substantially inverted L-shaped configuration having one end opening towards a working chamber which is a portion of the hollow 25 in the power piston 24 and which is defined at 46 by the switching valve 30 and the follower valve 40. The other end of the passage 45 is opened at 45a on the inner peripheral surface of the follower valve 40 and is so positioned as will be described later.

A control valve 47 in the form of an elongated rod of a diameter equal to or slightly smaller than the inner diameter of the follower valve 40 is slidingly accommodated within the hollow of the follower valve 40 for movement between expanded and contracted positions and is substantially divided into a body portion and a land portion 47a by an annular groove 48 defined on the peripheral surface of said control valve 47. One end of the control valve 47 remote from its land portion 47a is slidingly engaged in a recess 49 defined in the bottom wall 24a, the depth of said recess 49 being so selected as to be substantially equal to or greater than the maximum possible stroke of movement of the control valve 47 from the contracted position to the expanded position. This control valve 47 is normally biased towards the contracted position by a compression spring 50 positioned within the hollow in the switching valve 30 between the apertured lid 30a and an end face of the control valve 47 adjacent the land portion 47a.

In the construction so far described, assuming that no fluid under pressure is introduced through the fluid inlet 21b from the fluid source (not shown), the various valves 30, 40 and 41 are respectively held in their down, lowered and contracted positions by the action of the associated compression springs 41, 44 and 50 and, therefore, the power piston 24 is also held in the downwardly shifted position. At this time, the open end 27a of the passage 27 and the open end 29a of the second supply passage 29 are respectively aligned with the groove 35 while the open end 28a of the first supply passage 28 is communicated to the vent hole 23b through an annular portion of the hollow 25 which is defined between the inner peripheral surface of the power portion 24 and the outer peripheral surface of the switching valve 30. At the same time, the passages 42 and 43 in the follower valve 40 are in communication with the passages 37 and 36 in the switching valve 30, respectively, while the position and size of the open end 45a of the passage 45 are so selected as to be either closed by the land portion 47a of the control valve 47 or communicated to the vent hole 23b through the hollow in the switching valve 30 without communicating to the annular groove 48 on the control valve 47. The annular groove 48 is however communicated to the passage 42 in the follower valve.

The control valve 47 is operatively coupled to the temperature sensing column 1 by means of a pusher rod 51 axially movably extending between the control valve 47 and an actuator rod 1a of the temperature sensing column 1 through an elongated hollow 13a defined in the operating rod 13.

Although the temperature sensing column 1 is of a known construction and, therefore, the details thereof are not herein described, it is to be understood that the actuator rod 1a is operable in such a manner as to be outwardly projected and inwardly retracted upon expansion and contraction, respectively, of the thermally expansible material S within the column which are effected by variation in temperature of the fluid mixture emerging from the common outlet M. Therefore, it is clear that, upon expansion of the material S, the actuator rod 1a is outwardly projected to move the control valve 47 towards the expanded position, return of the control valve 47 back towards the contracted position being however effected by the compression spring 50 after the actuator rod 1a has been inwardly retracted incident to contraction of the material S.

The bottom lid 21a of the cylinder casing 21 is shown to have a cavity 52 defined therein and surrounding the operating rod 13, which cavity 52 serves to collect fluid medium which may leak thereinto from the interior of the casing 10 and/or from the working chamber 22a, the collected fluid medium in the cavity 52 being removed through a passage 53, also defined in the bottom lid 21a, in any suitable manner. The bottom lid 21a also shown to have an outer surface formed with an annular valve seat 21c for defining the first position of the proportioning valve member 12 in which communication between the second inlet passage Ha and the common outlet passage Ma can be completely interrupted.

It is to be noted that the vent hole 23b may be connected either to the atmosphere where the fluid under pressure introduced to the inlet 21b is air or to a fluid reservoir where the fluid introduced to the inlet 21b is hydraulic medium, which fluid reservoir may be further connected back to the fluid source from which the fluid medium is supplied to the inlet 21b.

While the temperature controlled valve assembly is constructed such as hereinbefore described, the operation thereof will now be described. It is, however, to be noted that, throughout the operation of the temperature controlled valve assembly, the fluid under pressure, which is hereinafter referred to as a drive fluid, is continuously supplied from the source thereof to the inlet 21b.

In FIG. 2, the thermally expansible material S in the sensing column 1 is shown to be in a state of equilibrium and, therefore, the proportioning valve member 12 is shown to be positioned to allow, for example, equal amounts of the hot and cold fluid mediums to be mixed in the casing 10. In other words, the temperature of the mixed fluid emerging from the common outlet M is assumed to be of a predetermined or desired value when the thermally expansible material S in the temperature sensing column 1 is in the state of equilibrium without being expanded and contracted. In this condition, since the drive fluid is continuously supplied from the source thereof to the inlet 21b after the temperature controlled valve assembly of the present invention has been installed on a pipeline site with the hot fluid passage Ha, the cold fluid passage Ca and the common fluid passage Ma respectively connected to the hot fluid source, the cold fluid source and a processing station where the fluid medium of predetermined or desired temperature is required, the various movable parts of the temperature controlled valve assembly assume such positions as shown in FIG. 2. In other words during the condition shown in FIG. 2, the open ends 28a and 29a of the associated supply passages 28 and 29 and the open ends 45a of the passage 45 are respectively closed by the lands 33 and 32 and the land portion 47a while the control valve 47 is stabilized at a position substantially intermediately between its expanded and constructed positions and, therefore, the follower valve 40 and the switching valve 30 are respectively positioned substantially intermediately between the elevated and lowered positions as shown. It is to be noted that the compression spring 41 exerts an axial pushing force on the switching valve 30 in an amount equal to or greater than the sum of the axial pushing force of the compression spring 44 and that of the compression spring 50.

With the above in mind, starting from the condition as shown in FIG. 2, when the temperature of the mixed fluid flowing in contact with the temperature sensing column 1 becomes higher than the desired value, the actuator rod 1a of the sensing column 1a is outwardly projected upon consequent expansion of the thermally expansible material S, resulting in movement of the control valve 47 towards the expanded position. Simultaneously therewith or shortly after the movement of the control valve 47 towards the expanded position from the position as shown, the land portion 47a allows gradual opening of the open end 45a of the passage 45 in the follower valve 40. As will become clear later, the open end 45a of the passage 45 is cyclically opened and closed by the land portion 47a during the continued movement of the control valve 47 towards the expanded positions which takes place so long as the thermally expansible material S continues to expand.

During the opening of the open end 45a of the passage 45 in the valve 47, the drive fluid intruduced into the annular groove 48 from the inlet 21b by way of the passages 27, 37 and 42 flows through the passage 47 into the working chamber 46 to move the follower valve 40 and the switching valve 30 towards their up and upwardly elevated positions, respectively against the compression springs 50 and 41. (It is to be noted that, even if the valves 40 and 30 are positioned at their down and lowered positions, respectively, the both can be moved towards their up and elevated position by the drive fluid because of the provisions of the radial grooves 40a and 40c through which the pressure introduced through the passage 45 acts on said valves 40 and 30.) The follower valve 40 therefore moves in pursuit of the movement of the control valve 47 and the consequence is the repeated cycle of opening and closing of the open end 45a of the passage 45 that continues until the temperature of the mixed fluid sensed by the sensing column 1 is recovered to the desired value.

On the other hand, the movement of the switching valve 30 towards the elevated position from the position as shown in FIG. 2 by the action of the drive fluid introduced into the working chamber 46 results in simultaneous opening of the open ends 28a and 29a of the respective passages 28 and 29 which have been closed by the lands 33 and 32 aligned therewith. The consequence is that the drive fluid supplied to the annular groove 35 from the inlet 21b through the passage 27 is introduced into the first supply passage 28 through the open end 28a then opened and further into the working chamber 22a while the fluid medium contained in the working chamber 22b is exhausted towards the vent hole 23b through the passage 29 by way of the open end 29a, then opened to communicate with the groove 34 which is in turn communicated to the passage 43 through the passage 36 by way of the groove 38. The drive fluid so introduced into the working chamber 22a causes the power piston 24 to move from the position as shown towards the upwardly shifted position and, therefore, the proportioning valve member 12 fast with the power piston 24 is upwardly moved towards the first position.

The upward shift of the power piston 24 so effected by the drive fluid introduced into the working chamber 22a continues until the open end 28a of the passage 28 is completely closed by the land 33 on the switching valve 30 while the open end 29a of the passage 29 may be either completely closed by the land 32 or partially communicated with the groove 34. However, where a fail-safe compression spring, such as shown by 54 by the phanthom line, is employed and positioned within the working chamber 22b to bias the power piston 24 towards the upwardly shifted position, for the purpose as will be described later, the open end 29a of the passage 29 should be so positioned relative to the open end 28a of the passage 28 that these open ends 28a and 29a can be simultaneously closed by the associated lands 33 and 32 during the movement of the switching valve 30 relative to the power piston 24.

As hereinbefore described, the upward shift of the proportioning valve member 12 results in the less amount of the hot fluid flowing into the outlet passage Ma than the amount of the cold fluid, resulting in reduction of the once increased temperature of the mixed fluid to the predetermined or desired value. During this reduction of the temperature of the mixed fluid to the predetermined or desired value, thermal contraction takes place in the thermally expansible material S restoring back to the state of equilibrium.

Upon contraction of the thermally expansible material S, the control valve 47 is moved towards the contracted position by the action of the compression spring 50 with the land portion 47a opening the open end 45a of the passage 45 so that the pressure within the working chamber 46 is allowed to be discharged towards the vent hole 23b through the aperture 30b. The consequence is that the follower valve 40 and the switching valve 30 are simultaneously moved by the action of the compression springs 50 and 40, respectively, towards the down and lowered positions. Upon the movement of the switching valve 30 towards the lowered position, the open end 28a of the passage 28 is opened to communicate with the hollow 25 in the power piston 24 on one hand and the open end 29a of the passage 29 is opened to communicate with the annular groove 35.

Therefore, the pressure within the working chamber 22a is discharged towards the vent hole 23b through the passage 28 by way of the hollow 25 in the power piston 24 while the drive fluid supplied to the groove 35 is introduced through the passage 29 into the working chamber 22b thereby causing the power piston 24 to move towards the downwardly shifted position. This continues until the thermally expansible material S once expanded is restored back to the state of equilibrium with the various movable parts of the temperature controlled valve assembly being positioned as shown in FIG. 2.

From the foregoing, it is readily be understood that the temperature controlled valve assembly operates in a substantially reverse manner when the more amount of the cold fluid than the amount of the hot fluid is introduced into the common outlet passage Ma with the temperature sensing column detecting reduction in temperature of the mixed fluid below the predetermined or desired value.

Figure 3:
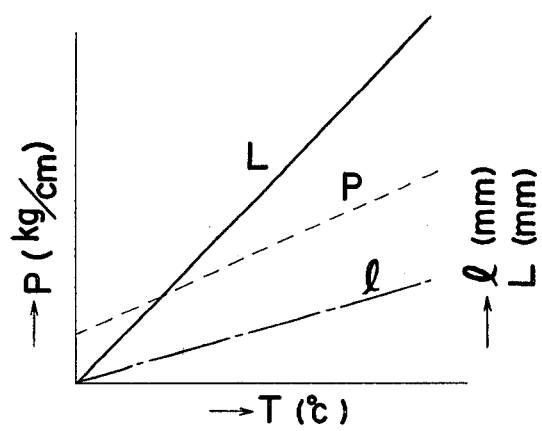
FIG. 3 is a chart illustrating the performance of the valve assembly shown in FIG. 2.

While the temperature controlled valve assembly is constructed and operates in the manner as hereinbefore described, it is clear that, during, for example, the continued expansion of the thermally expansible material S, that is, during the continued movement of the control valve 47 towards the expanded positions followed by the movement of the follower valve 40 and the switching valve 30, the power piston 24 continues to move towards the upwardly shifted position. In other words the movements of the power piston 24 towards the upwardly shifted position continues so long as the expansion of the thermally expansible material S takes place and, therefore, it is clear that a slight movement of the control valve 47 results in a substantially amplified stroke of movement of the power piston 24. This is evident from FIG. 3 illustrating a graph wherein the axis of abscissas represents variation in temperature T of the mixed fluid sensed by the temperature sensing column 1 while the axis of ordinates represents respective variations of the distance $l$ of movement of the follower valve 40 resulting from expansion of the thermally expansible material S, the pressure P within the working chamber 46 and the distance L of movement of the power piston 24. From the graph of FIG. 3, it is clear that, while the pressure P substantially parallel to the distance $l$ of movement of the follower valve 40, the distance L of movement of the power piston is substantially four times that of the follower valve 40. It is to be noted that the distance of movement of the power piston 24 relative to that of the follower valve can be adjusted by suitably selecting the compression spring 41. For example, the lower the spring constant of the compression spring 41, the greater the distance of movement of the power piston 24.

Figure 4:
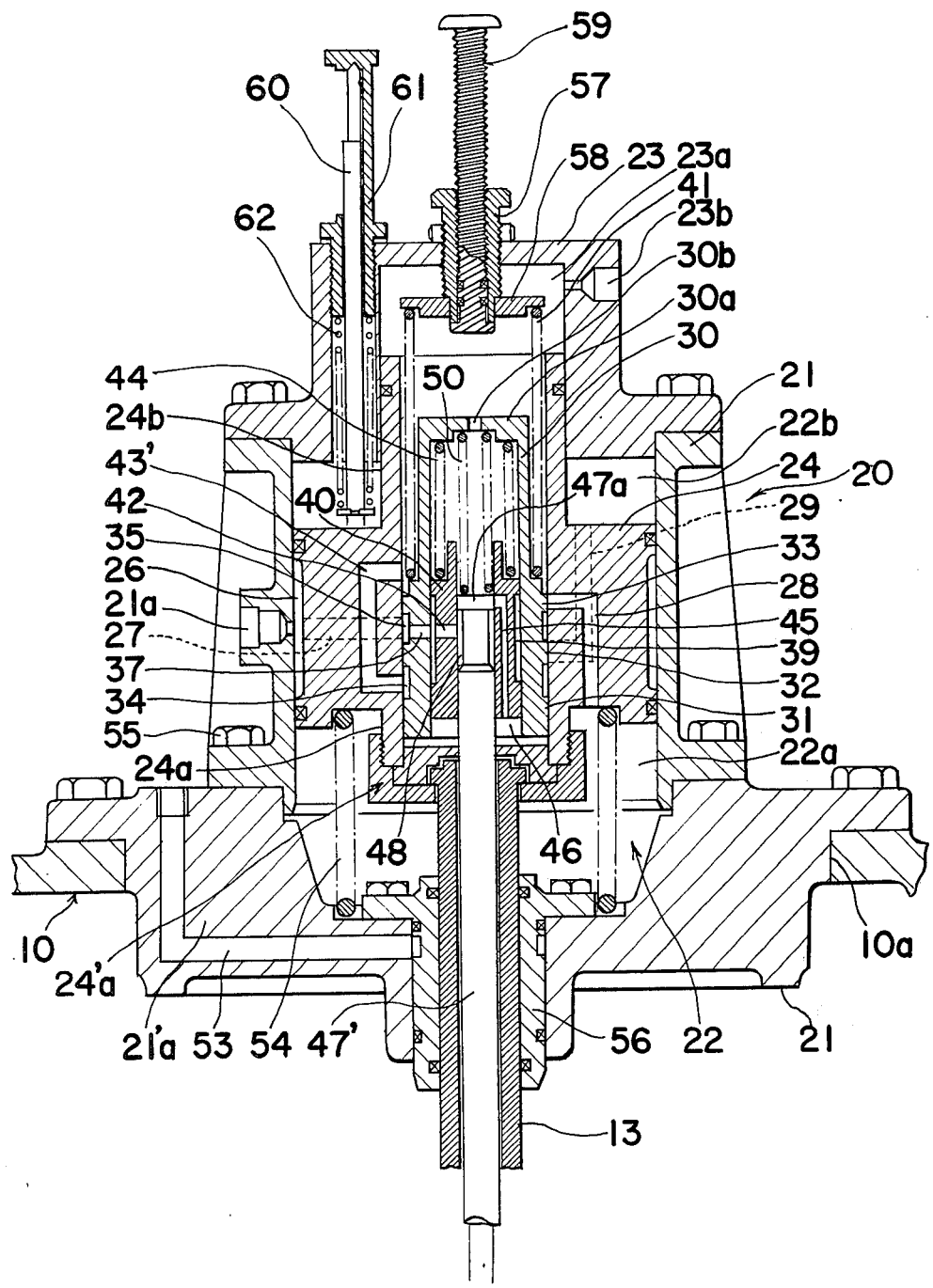

The temperature controlled valve assembly according to the present invention may have one or both of an adjustment for adjusting the axial expanding force exerted by the compression spring 41 on the switching valve 30 and an indicator for visually displaying the position of the power piston 24 and, hence, the proportioning valve member 12, such as shown in FIG. 4. It is to be noted that, in FIG. 4, the temperature controlled valve assembly is shown to have both of the adjustment and the indicator and is different in construction from that shown in FIG. 2.

Referring now to FIG. 4, the passage, identified by 43 in FIG. 2 and described as defined in the follower value 40 in the foregoing embodiment is shown to be defined at 43' in the power piston 24 and, therefore, the annular groove 38 and the passage 36, both employed in the foregoing embodiment in association with the passage 43, are omitted because, in the embodiment of FIG. 4, such groove 38 and passage 36 are no longer necessary. In addition while in the embodiment of FIG. 2 the control valve 47 and the pusher rod 51 have been described as constituted by separate and independent parts, the control valve 47 in the embodiment of FIG. 4 is shown to be integrally formed with the pusher rod as identified by 47'. Moreover, the bottom wall 24'a is shown to be threaded to the reduced diameter portion 24a of the power piston 24 while it loosely supports the end of the operating rod 13 in such a manner as to allow the rod 13 to undergo a lateral movement in a radial direction. The connection of the operating rod 13 to the bottom wall 24'a in the manner as shown in FIG. 4 and described above is advantageous in that any possible twist of the rod 13 relative to the power piston 24 can be avoided.

Furthermore, for the purpose of facilitation of assemblage of the temperature controlled valve assembly, particularly, the fluid-operated power cylinder, the cylinder casing 21, which has been described as having the bottom lid 21a integral therewith in the foregoing enbodiment, is shown to have the bottom lid 21'a connected to the casing 21 by means of a plurality of set bolts 55. In addition, the bottom lid 21'a is shown to have a bearing sleeve 56 for the support of the operating rod 13.

The adjustment for adjusting the axial expanding force exerted by the compression spring 41 on the switching valve 30 is shown to comprise an adjustment screw 57 having one end situated within the cavity 23a and the other end formed into a flanged head, a substantially intermediate portion extending adjustably through a wall of the cap 23 in alignment with the longitudinal axis of the control valve 47'. This adjustment screw 57 has an annular disc 58 connected to the first-mentioned end of said screw 57, to which disc 58 one of the ends of the compression spring 41 remote from the switching valve 30 is engaged. It will readily be see that by turning the adjustment screw in either direction, the length of the compression spring 41 can be varied and, therefore, the axial expanding force of the compression spring 41 can be adjusted.

Adjustably extending through the adjustment screw 57 is a safety screw 59 which, when any accident occurs, is turned in a fastening direction to forcibly move the switching valve 30 towards its lowered position. Fastening of this safety screw 59 may be made with reference to the indicator displaying the position of the power piston 24 as will be described in more detail later.

The indicator comprises a floating rod 60 axially movably extending through an elongated support 61, rigidly threaded to the cap 23, in a direction parallel to the longitudinal axis of the cylinder casing 21. This floating rod 60 is biased by a compression spring 62 in one direction with one of its opposed ends constantly engaged to the power piston 24. The other end of the floating rod 60 serves as a pointer which visually represents the position of the power piston 24 within the compartment 22 in alignment with one of scales (not shown) calibrated in the support 61 along the path of movement of said other end of said floating rod 60.

Where the safety screw 59 and the indicator are employed such as shown in FIG. 4, the employment of the compression spring 54, which has been described as optional in the embodiment of FIG. 2, is recommended. This is because, when the drive fluid fails to operate the power cylinder 20 due, for example, to malfunctioning of the fluid source, the power piston 24 is upwardly shifted by the compression spring 54 while the control valve 47, follower valve and switching valve 30 are forced towards the contracted, down and downwardly shifted positions, respectively, by the action of the compression springs 50, 44 and 41, such as in the case of the embodiment of FIG. 2. As hereinbefore described, the upward shift of the power piston 24 results in movement of the proportioning valve member 12 towards the first position and only the cold fluid is allowed the flow from the passage Ca into the passage Ma.

However, in the embodiment of FIG. 4, by fastening the safety screw 59, the power piston 24 which has been upwardly shifted by the compression spring 54 can be positioned substantially intermediately between its upwardly and downwardly shifted positions after at least the switching valve 30 is forced to completely move to the down positions with the inner end of the screw 59 engaged to the apertured lid 30a. The indicator with the end of the floating rod 60 aligned with any one of the calibrated scales provides a visual information as to the position of the power piston 24 within the compartment 22. Therefore, it is clear that, even if the drive fluid fails to operate the power cylinder 20, the temperature of the mixed fluid to be discharged through the common outlet passage Ma can be maintained at the predetermined or desired value after the safety screw 59 has been manipulated in a manner as hereinbefore described.

In any one of the foregoing embodiments shown in FIGS. 2 and 4, the temperature sensing column 1 has been described and shown as carried by the operating rod 13 for movement together with the power piston 24. However, where it is desired to install the temperature sensing column on a pipeline extending from the common outlet port M or at a fixed position within the casing 10 separately of the operating rod 13, the temperature controlled valve assembly constructed and shown in FIG. 5 is reccommendable.

Referring to FIG. 5, the temperature sensing column 1 is shown to be threaded to a cylindrical housing 100 detachably mounted on the casing 10 with the column 1 situated in the common outlet passage Ma. Operatively housed within the housing 100 is a follower valve 140 movable between left and right positions and normally biased towards the left position by the action of a compression spring 144. This follower valve 140 has an outer peripheral surface formed with an annular groove 139 which is constantly in communication with a source FS of drive fluid under pressure through an inlet port 100a defined in the housing 100. The follower valve 140 also has at least one passage 145 of substantially L-shaped configuration having one end opening at 145a on the inner peripheral surface thereof and the other end opening towards a working chamber 100b which is in communication with a drive fluid outlet 100c defined in the housing 100.

Slidably extending through the hollow of the follower valve 140 is a control valve 147 movable between contracted and expanded positions, said control valve 147 being normally biased towards the contracted position by a compression spring 150 arranged in coaxial and parallel relation to the compression spring 144 with one end of said control valve 147 constantly engaged to the actuator rod 1a of the temperature sensing column 1. The otehr end of the control valve 147 is formed into a land portion 145a. An annular groove 148 is defined on the outer peripheral surface of the control valve 147 at a position adjacent the land portion 147a which is in constant communication with the groove 139 through a passage defined at 142 in the follower valve 142.

The position of the open end 145a relative to the land portion 147a is so selected that, when the control valve 147 and the follower valve 140 are respectively held in the left and contracted positions or when the thermally expansible material S in the sensing column 1 is in a state of equilibrium as hereinbefore described in connection with the embodiment of FIG. 2, the open end 145a is closed by the land portion 147a.

In the construction so far described, assuming that the drive fluid is supplied under pressure from the source FS thereof, and when the thermally expansible material S undergoes, for example, expansion in response to the increased temperature of the mixed fluid flowing through the common outlet passage Ma, the control valve 147 is axially displaced towards the expanded position against the compression spring 150 thereby allowing the drive fluid constantly supplied into the annular groove 148 to enter the open end 145a of the passage 145. Therefore, the drive fluid is applied into the working chamber 100b through the passage 145, which drive fluid then acts to move the follower valve 147 towards the right position against the compression spring 144 in pursuit of the control valve 147 on one hand and is discharged through the outlet 100c on the other hand. It is accordingly clear that, the open end 145a of the passage 145 is opened and closed in repeated cycle by the land portions 147a during the continued expansion of the material S in the column 1.

In the event, that the thermally expansible material S undergoes contraction while the control valve 147 and the follower valve 140 are positioned such as shown in FIG. 5, the both operate in a substantially reverse manner and the drive fluid within the working chamber 100b is exhausted to the outside of the housing 100 through a vent hole 100d, defined in the housing 100, by way of another working chamber in the housing 100 which is opposed to the working chamber 100b and in which the compression springs 144 and 150 are accommodated.

The proportioning valve member 12 is, in FIG. 5, shown to be rigidly carried by an operating rod 130 shown to be integral with and extending outwards from a power piston 240 through the bottom lid 21a. The power piston 240 has one end integral with the operating rod 130 and the other end formed with an extension 240a outwardly extending therefrom in alignment with the longitudinal axis of any one of the piston 240 and the operating rod 130 and slidably guided in a manner as will subsequently be described. The power piston 240 has an elongated bore 250 extending completely through the entire length of the extension 240a and also that of the piston 240 in coaxial relation thereto and terminating in the operating rod 130, and also has an annular groove 260 defined on the outer peripheral surface of the power piston 240, which annular groove 260 is constantly in communication with the drive fluid source FS through the inlet 21b in the casing 21 during movement of said power piston 240 between upwardly and downwardly shifted positions.

Like the power piston 24 in the foregoing embodiments of FIGS. 2 and 4, the power piston 240 is formed therein with at least one first supply passage 280 of substantially L-shaped configuration, having one end opening towards the working chamber 22a and the other end 280a opening towards the bore 250, and at least one second supply passage 290 of substantially L-shaped configuration having one end opening towards the working chamber 22b and the other end 290a situated below the open end 280a of the passage 280 and opening towards the bore 250. The power piston 240 is further formed therein with a passage 270 having one end opening towards the groove 290 on the outer peripheral surface of the power piston 240 and the other end opening towards the bore 250 at a position substantially intermediately between the open ends 280a and 290a of the respective passages 280 and 290.

A cap 230 rigidly mounted on the top opening of the cylinder casing 21 is of a construction having a cavity 230a defined therein and substantially confined by a disc wall 230b. The disc wall 230b has a guide hole 230c through which the piston extension 240a slidably extends. The cap 230 has an intake port defined at 230d, which intake port 230d is communicated to the drive fluid source FS.

The cavity 230a in the cap 230 is divided into two working chambers 230e and 230f by a piston member 301 forming a part of a switching valve unit together with a switching valve 300 which will now be described.

The switching valve 300 is in the form of an elongated rod of a diameter smaller than the diameter of the bore 250 and having one end shown to be integral with the piston member 301 and the other end formed with a pair of lands 300a and 300b spaced from each other a distance corresponding to the spacing between the open ends 280a and 290a of the respective passages 280 and 290, each of said lands 300a and 300b having a diameter substantially equal to the diameter of the bore 250. The switching valve 300 has formed therein a substantially T-shaped passage constituted by an axial passage portion 302, extending in alignment with the longitudinal axis of the switching valve 300 and opening on one end face of said valve 300 remote from the piston member 301, and a transverse passage portion 303 radially outwardly extending in the opposite direction from the other end of the axial passage portion 302 and having both ends opening toward an annular space defined by the difference in diameter between the valve 300 and the bore 250.

The switching valve 300 is movable within the bore 250 between up and down positions and is normally biased towards the up positions by a compression spring 410 housed within the working chamber 230f around the switching valve 300 and between the piston member 301 and the disc wall 230b.

The switching valve 300 is so designed and so arranged that, so long as the thermally expansible material S is in the state of equilibrium with the control valve 147 and the follower valve 147 positioned as shown in FIG. 5, the switching valve 300 is held substantially intermediately between its up and down positions, as shown, with the lands 300a and 300b respectively closing the open ends 280a and 290a. In this condition as shown in FIG. 5, the pressure acting within the working chamber 230a on the piston member 301 so as to urge the switching valve 300 towards the down position remains equalized to the force of the compression spring 410 acting on the piston member 301 so as to urge the switching valve 300 towards the down position. In addition, the pressure within the working chamber 22b is also equalized to the pressure within the working chamber 22a.

Starting from the condition as shown in FIG. 5, expansion of the thermally expansible material S results in the movement of the follower valve 140 in pursuit of the control valve 147 then moved towards the expanded position, thereby allowing the drive fluid from the source FS thereof to flow into the working chamber 100b which is in turn supplied to the working chamber 230e. As the drive fluid is supplied into the working chamber 230e, the siwtching valve 300 is forced to move towards the down position against the compression spring 410 and, therefore, the open ends 280a and 290a of the respective passages 280 and 290, which have been closed by the associated lands 300a and 300b on the switching valve 300, are opened. Upon opening of these open ends 280a and 290a, the fluid within the working chamber 22a is exhausted to the outside through the passage 280 by way of the working chamber 230f which is communicated to the outside through a vent hole 230g defined in the cap 230 and, on the other hand, the drive fluid supplied to the intake port 21b is allowed to enter into the working chamber 22b through the passage 270, then a space defined around the switching valve 300 between the lands 300a and 300b, and finally the passage 290. It is to be noted that, during the movement of the switching valve 300 towards the down position which is effected in the manner as hereinbefore described, the pressure confined within the bore 250 can be exhausted to the outside through the T-shaped passage in the switching valve 300.

Therefore it is clear that the power piston 240 is forced by the pressure within the working chamber 22b overcoming the pressure within the working chamber 22a to move towards the downwardly shifted position, the consequence being that the proportioning valve member 12 carried by the power piston 240 through the operating rod 130 is so lowered axially that the hot fluid medium from the passage Ha is allowed to admix with a stream of the cold fluid medium from the passage Ca in an amount less than that of the latter.

After the mixed fluid flowing through the passage Ma has attained the predetermined or desired temperature, the thermally expansible material S once expanded subsequently undergoes contraction. Once this construction takes place, the fluid within the working chamber 230e is exhausted to the outside through the working chamber 100b way of the passage 145 and then the vent hole 100d in the housing 100d and, therefore, the switching valve 30 can be returned to the original position as shown by the action of the compression spring 40.

From the foregoing description, it is clear that the temperature controlled valve assembly of the construction shown in FIG. 5 serves the same purpose as achieved by the temperature controlled valve assembly of the construction shown in any one of FIGS. 2 and 4.

Although the present invention has fully been described in connection with the preferred embodiments thereof, it is to be noted that various changes and modifications are apparent to those skilled in the art. Such changes and modifications, unless they depart from the true scope of the present invention, are to be construed as included therein.

What is claimed is:

1. A temperature controlled valve assembly which comprises, in combination:

a valve housing structure including first and second housings having first and second compartments defined therein, respectively, said first housing having hot and cold fluid inlet ports for the introduction of hot and cold fluid mediums, respectively, from associated sources thereof into the first compartment and a common outlet port for the discharge of a mixture of the hot and cold fluid mediums to the outside of the first housing, said second housing further having a drive fluid inlet port adapted to be coupled to a source of a drive fluid under pressure and a vent hole for the discharge of the drive fluid to the outside of the second housing;

a proportioning valve means housed within the first compartment for movement between hot and cold positions, said proportioning valve member when moved towards the hot position decreasing the substantial opening of the cold fluid inlet port and correspondingly increasing the substantial opening of the hot fluid inlet port while said proportioning valve member when moved towards the cold position increases the substantial opening of the cold fluid inlet port and correspondingly decreases the substantial opening of the hot fluid inlet port, said proportioning valve member being held in position substantially intermediately between the hot and cold positions when and so long as the fluid mixture attains a predetermined temperature;

a temperature sensor for sensing variation in temperature of the fluid mixture and for generating one at a time first and second mechanical signals indicative of reduction and increase in temperature of the fluid mixture, respectively, with respect to the predetermined temperature of the fluid mixture;

a power piston means connected with said proportioning valve means for movement together therewith and operatively housed within the second compartment, said second compartment being divided into first and second sealed working chambers one on each side of said power piston means, said power piston means having a cavity defined therein;

a relay passage means defined in the power piston means and having one end opening towards the cavity and the other end held in constant communication with the drive fluit inlet port during the movement of the power piston means;

first and second supply passage means defined in the power piston means, said first supply passage means having first and second open ends respectively opening towards the first working chamber and the cavity, said second supply passage means having first and second open ends respectively opening towards the second working chamber and the cavity, said second open ends of the respective first and second supply passage means being positioned spaced from each other a predetermined distance;

a switching valve means housed within said cavity in the power piston means for movement between first and second positions in a direction parallel to and coaxial with the direction of movement of the power piston means and dividing the cavity in the power piston means into third and fourth working chambers one on each side of the switching valve means, said third working chamber being communicated to the outside of the second housing through the vent hole;

first and second switching passage means defined in the switching valve means, said first switching passage means being constantly communicated to the relay passage means through said one end thereof during the movement of the switching valve means between the first and second positions and adapted to communicate selectively with the first and second supply passage means through their respective second open ends, said second switching passage means being adapted to communicate with said second supply passage means through the second open end thereof;

a first biasing means for causing the switching valve means to tend to move towards its second position, said first and second supply passage means being communicated to the first switching passage means and to the third working chamber, respectively, when the switching valve means is held in the second position irrespective of the position of the power piston means;

first and second lands defined on the switching valve means, said first and second lands closing the second open ends of the first and second supply passage means, respectively, when and so long as the fluid mixture attains the predetermined temperature with the switching valve means positioned substantially intermediately between the first and second positions, said first and second lands being spaced from each other a distance equal to the distance between the second open ends of the respective first and second supply passage means;

a first vent passage means communicating between the second switching passage means and the third working chamber, the first working chamber, when the second land opens the second open end of the second supply passage upon movement of the switching valve means towards the first position relative to the power piston means to establish the communication between the second supply passage means and the second switching passage means, being vented through said first vent passage means to the vent hole, the second open end of the first supply passage means being, when the second supply passage means is so communicated to the vent hole through said first vent passage means, communicated to the first switching passage means thereby allowing the drive fluid to be supplied into the second working chamber to move the power piston means in a direction with the proportioning valve member being consequently moved towards the cold position;

an operating valve means operatively associated with the temperature sensor and movable in first and second directions opposed to each other in response to the first and second mechanical signals, respectively, said operating valve means when moved in said second direction establishing a communication between the first switching passage means and the fourth working chamber thereby allowing the drive fluid to be supplied into the fourth working chamber to move the switching valve means towards the first position against the first biasing means with the drive fluid within the first switching passage means being also supplied into the second working chamber through the second supply passage means whereby the power piston means is moved in a direction with the proportioning valve member being moved towards the hot position, said operating valve means when moved in said first direction establishing a communication between the first switching passage means and the first working chamber through the first supply passage means, a communication between the fourth working chamber and the vent hole and a communication between the second working chamber to the vent hole through the second supply passage means whereby the power piston means is moved by the drive fluid, supplied into the first working chamber, in a direction with the proportioning valve member moved towards the cold position; and a second biasing means for causing the operating valve means to tend to move in the second direction, said operating valve means being moved in the first direction against the second biasing means when the drive fluid is supplied into the fourth working chamber;

the pressure within the first working chamber and that within the second working chamber being equalized to each other in the absence of any one of the first and second mechanical signal.

2. A temperature controlled valve assembly as claimed in claim 1, wherein said switching valve means has a cavity of cylindrical configuration defined therein and wherein said operating valve means comprises a sleeve-like follower valve member having a bore extending completely through the length of said follower valve member in coaxial relation to the longitudinal axis of said follower valve member, the fourth working chamber being defined by said switching valve means in cooperation with said follower valve member, said follower valve member having a first passage defined therein, which first passage has one end opening towards the bore and the other end opening toward the fourth working chamber, and a second passage constantly communicated to the first switching passage means, said follower valve means being accommodated within the cavity in the switching valve means for movement between first and second operative positions, said follower valve member being biased by said second biasing means towards the second operative position, and a control valve member operatively housed within the bore in the follower valve member for movement between expanded and contracted positions in coaxial relation to the longitudinal axis of the follower valve member, said control valve member having one end operatively coupled to the temperature sensor and an annular groove defined therearound adjacent the other end thereof, said annular groove being communicated to the first switching passage means through the second passage in the follower valve member, the other end of said control valve member being, during the absence of any one of the first and second mechanical signals, held in position to close the one end of the first passage in the follower valve member, said first passage in the follower valve member being communicated to the vent hole when the control valve member is moved towards the contracted position in response to the first mechanical signal, said first passage in the follower valve member being communicated to the first switching passage means through the second passage in the follower valve member to supply the drive fluid into the fourth working chamber when the control valve member is moved towards the expanded position in response to the second mechanical signal.

3. A temperature controlled valve assembly as claimed in claim 1, wherein the first vent passage means includes a passage portion defined in the operating valve means and having one end constantly communicated to the second switching passage means in the switching valve means and the other end communicated to the vent hole.

4. A temperature controlled valve assembly as claimed in claim 2, wherein the first vent passage means includes a passage portion defined in the follower valve member and having one end constantly communicated to the second switching passage means in the switching valve means and the other end communicated to the vent hole.

5. A temperature controlled valve assembly as claimed in claim 1, wherein the first vent passage means includes a passage portion defined in the power piston means and having one end constantly communicated to the second switching passage means in the switching valve means and the other end communicated to the vent hole.

6. A temperature controlled valve assembly as claimed claim 2, wherein the first vent passage means includes a passage portion defined in the power piston means and having one end constantly communicated to the second switching passage means in the switching valve means and the other end communicated to the vent hole.

7. A temperature controlled valve assembly as claimed in claim 2, wherein said second biasing means comprises first and second compression springs, the first compression spring biasing the follower valve member towards the second operative position and the second compression spring biasing the control valve member towards the contracted position.

8. A temperature controlled valve assembly as claimed in claim 3, wherein said second biasing means comprises first and second compression springs, the first compression spring biasing the follower valve member towards the second operative position and the second compression spring biasing the control valve member towards the contracted position.

9. A temperature controlled valve assembly as claimed in claim 4, wherein said second biasing means comprises first and second compression springs, the first compression spring biasing the follower valve member towards the second operative position and the second compression spring biasing the control valve member towards the contracted position.

10. A temperature controlled valve assembly as claimed in claim 5, wherein said second biasing means comprises first and second compression springs, the first compression spring biasing the follower valve member towards the second operative position and the second compression spring biasing the control valve member towards the contracted position.

11. A temperature controlled valve assembly as claimed in claim 6, wherein said second biasing means comprises first and second compression springs, the first compression spring biasing the follower valve member towards the second operative position and the second compression spring biasing the control valve member towards the contracted position.

12. A temperature controlled valve assembly which comprises, in combination:
a valve housing structure including first and second housings having first and second compartments defined therein, respectively, said first housing having hot and cold fluid inlet ports for the introduction of hot and cold fluid mediums, respectively, from associated sources thereof into the first compartment and a common outlet port for the discharge of a mixture of the hot and cold fluid mediums to the outside of the first housing, said second housing further having a drive fluid inlet port adapted to be coupled to a source of a drive fluid under pressure and a vent hole for the discharge of the drive fluid to the outside of the second housing, said second compartment being divided into first and second rooms, said drive fluid inlet port being in communication with the first room and said vent hole being in communication with said second room;
a proportioning valve means housed within the first compartment for movement between hot and cold positions, said proportioning valve member when moved towards the hot position decreasing the substantial opening of the cold fluid inlet port and correspondingly increasing the substantial opening of the hot fluid inlet port while said proportioning valve member when moved towards the cold position increases the substantial opening of the cold fluid inlet port and correspondingly decreases the substantial opening of the hot fluid inlet port, said proportioning valve member being held in position substantially intermediately between the hot and cold positions when and so long as the fluid mixture attains a predetermined temperature;
a temperature sensor for sensing variation in temperature of the fluid mixture and for generating one at a time first and second mechanical signals indicative of reduction and increase in temperature of the fluid mixture, respectively, with respect to the predetermined temperature of the fluid mixture;

a power piston means connected with the proportioning valve member for movement together therewith and operatively housed within the first room of the second compartment, said first room being divided into first and second sealed working chambers by said power piston means one on each side of said power piston means, said power piston means having an elongated cavity defined therein;

a relay passage means defined in the power piston means and having one end opening towards the cavity and the other end held in constant communication with the drive fluid inlet port irrespective of the position of the power piston means;

first and second supply passage means defined in the power piston means, said first supply passage means having first and second open ends respectively opening towards the first working chamber and the cavity, said second supply passage means having first and second open ends respectively opening towards the second working chamber and the cavity, said second open ends of the respective first and second supply passage means being positioned spaced a predetermined distance from each other;

a switching valve means including a piston member, movably housed within the first room of the second compartment, and a valving rod extending from the piston member into the cavity in the power piston means, said switching valve means being movable between first and second positions in a direction parallel to and coaxial with the direction of movement of the power piston means, the second open ends of the respective first and second supply passage means when said switching valve means is moved towards the first position being respectively communicated to the relay passage means and to the vent hole whereby the power piston means is moved in a direction with the proportioning valve member moved towards the hot position, the second open ends of the respective first and second supply passage means when said switching valve means is moved towards the second position being respectively communicated to the vent hole and to the relay passage means whereby the power piston means is moved in the opposite direction with the proportioning valve member moved towards the cold position; and means for supplying the drive fluid into the second room of the second compartment in response to the second mechanical signal to move the switching valve means towards the first position.

* * * * *